Dec. 6, 1932.  C. R. CRUMP  1,889,977
COMBINATION WOODWORKING MACHINE
Filed April 25, 1928   4 Sheets-Sheet 1

INVENTOR:
CLAUDE R. CRUMP,
BY
Jesse V. Whann
ATTORNEY.

Dec. 6, 1932.   C. R. CRUMP   1,889,977
COMBINATION WOODWORKING MACHINE
Filed April 25, 1928   4 Sheets-Sheet 2
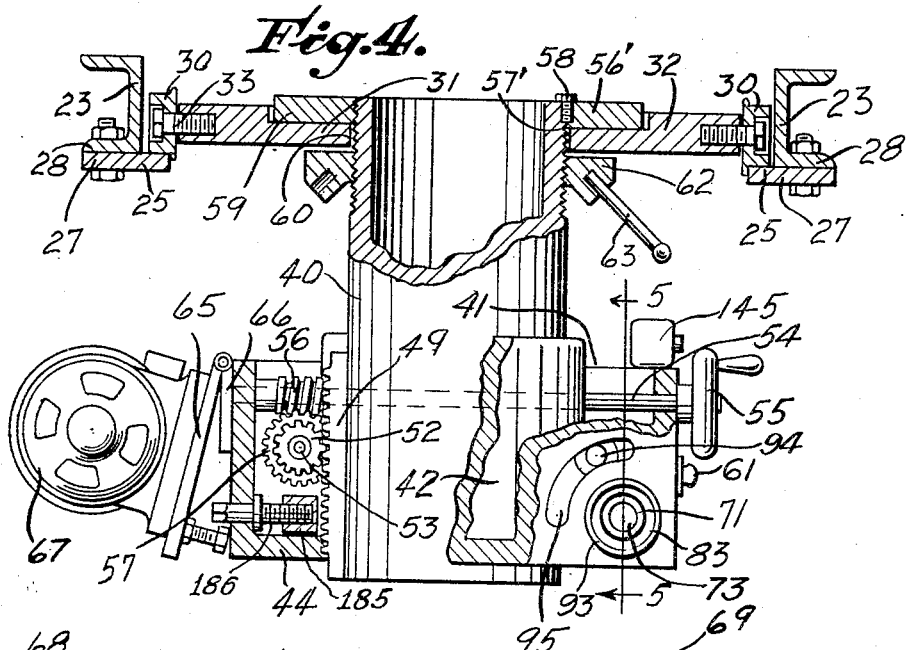
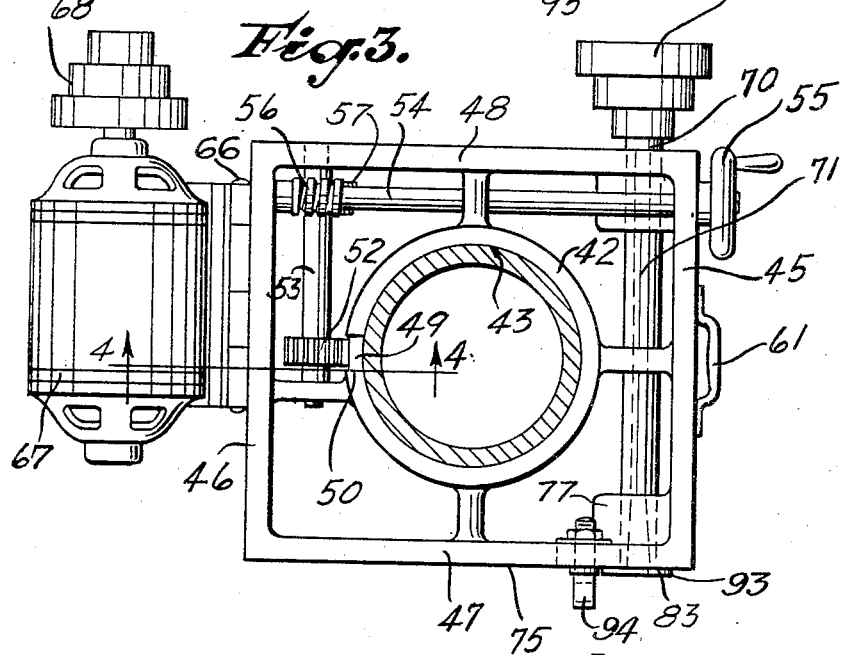
INVENTOR:
CLAUDE R. CRUMP.
BY Jesse P. Whann
ATTORNEY

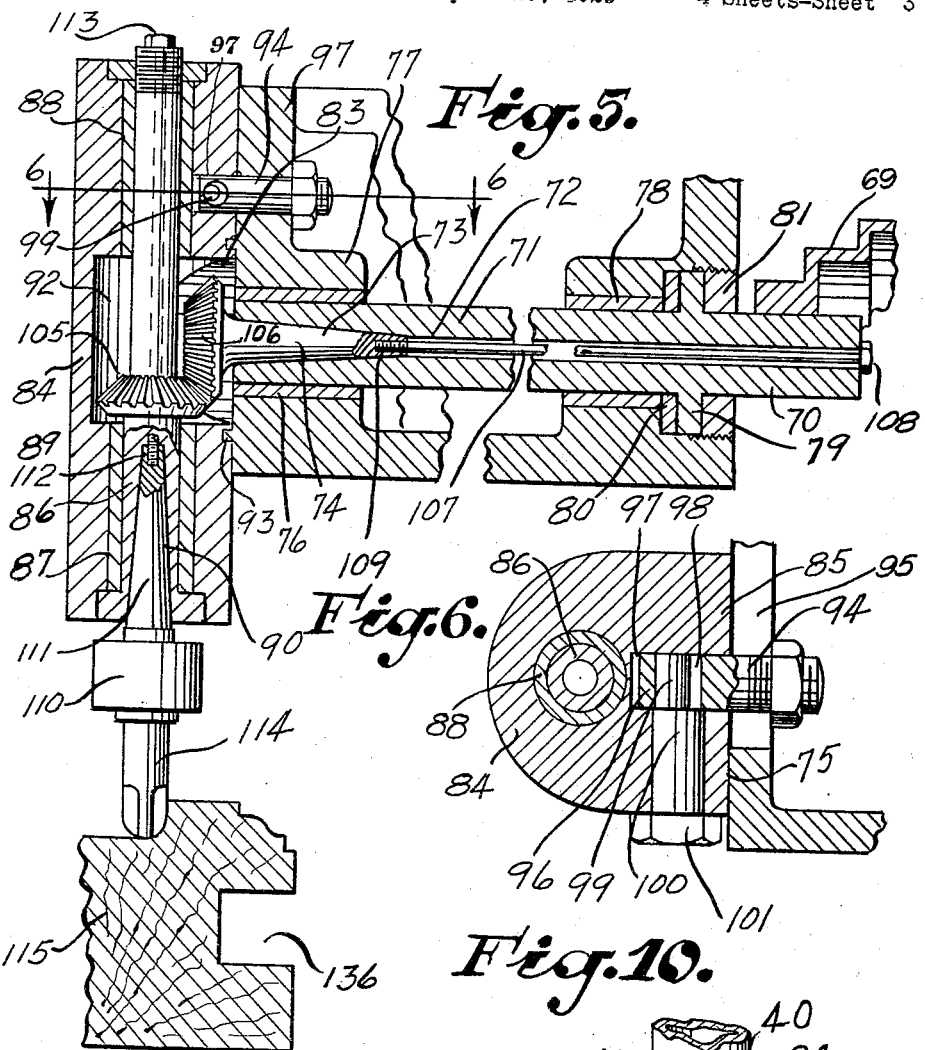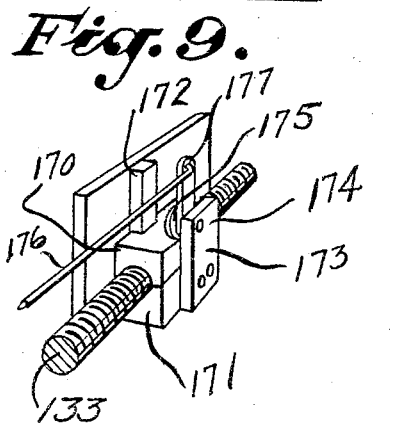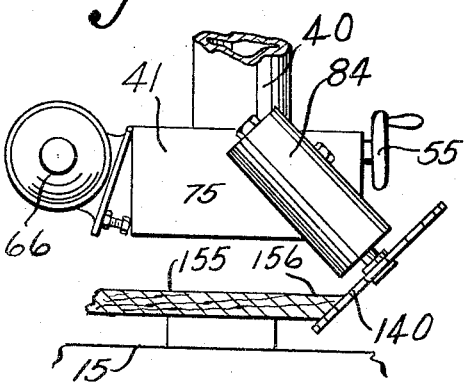

Dec. 6, 1932.   C. R. CRUMP   1,889,977
COMBINATION WOODWORKING MACHINE
Filed April 25, 1928   4 Sheets-Sheet 4
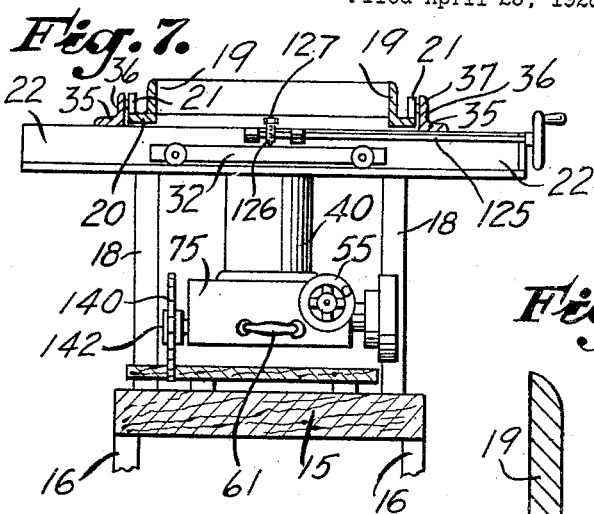
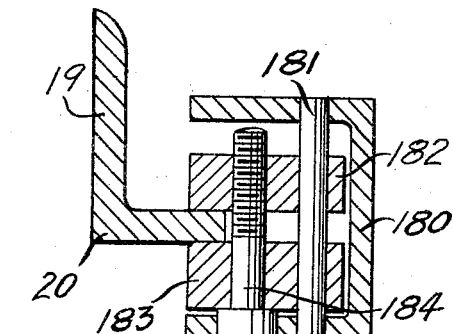
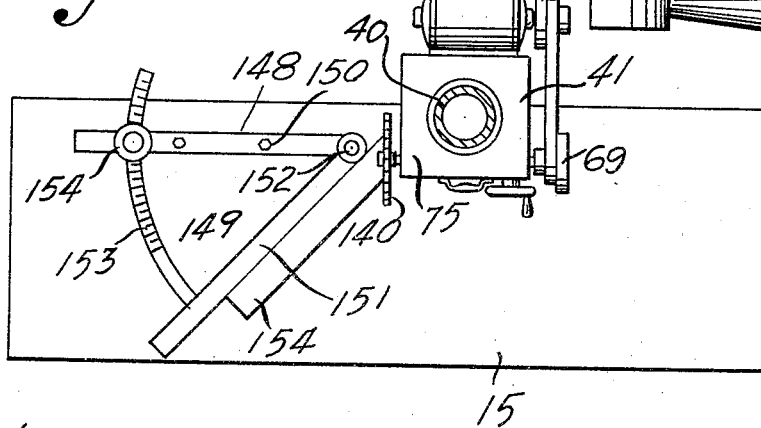
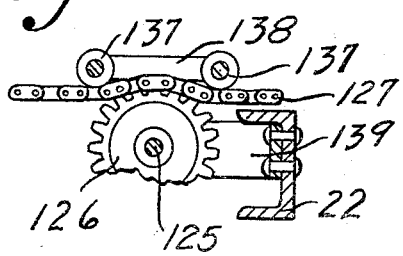
INVENTOR:
CLAUDE R. CRUMP
BY
Jesse P. Whann
ATTORNEY Patented Dec. 6, 1932

1,889,977

UNITED STATES PATENT OFFICE

CLAUDE R. CRUMP, OF LOS ANGELES, CALIFORNIA

COMBINATION WOODWORKING MACHINE

Application filed April 25, 1928. Serial No. 272,642.

It is an object of the invention to provide a tool head having power driven tool holders adjustable to hold the tools in any of a great variety of positions relative to the work, and to so support the tool head that it may be moved in any direction relative to the body of wood or other substance on which shaping or forming operations are to be performed.

It is an object of the invention to provide a support, such as a table, for the work, and a superstructure above the table with correlated structural parts for holding the tool head in suspension above the table and enabling the tool head to be moved in any desired direction relative to the table, thereby making it possible to apply cutting, forming and finishing tools to a body supported on the table, advancing the tools in the directions required to reduce the body to the desired form.

It is an object of the invention to provide in a device having the characteristics set forth above means for mechanically feeding the tool head in its various directions, such means being detachable and the tool head then being left free to be manually moved to make the desired cuts.

It is an object of the invention to provide a woodworking machine especially suitable for making duplicate parts or duplicate operations on different parts through the setting of proper stops and the use of master patterns across which a tracer or follower held in the tool head may be carried, and it is a further object to provide a woodworking machine which may be operated with great safety to the operator for the reason that in the use of such machine the work is held stationary in position and the desired tools are then moved across the work, instead of the present practice of moving the work across the rapidly rotating tools.

In the foregoing I have set forth briefly certain important objects of my invention, but other objects and advantages are to be found throughout the following part of the specification, which refers to the accompanying drawings which are for illustrative purposes only, and in which;—

Fig. 1 is a plan view of a simple embodiment of my invention, drawn to relatively small scale.

Fig. 2 is an elevational view corresponding to Fig. 1, showing the tool head of the machine turned so that the front thereof is facing the observer, the legs of the equipment being broken away.

Fig. 3 is an enlarged section through the supporting column of the tool head, taken on the plane indicated by the line 3—3 of Fig. 2 and showing a plan view of the tool head to enlarged scale.

Fig. 4 is an elevation showing the tool head partly sectioned on a plane indicated by the line 4—4 of Fig. 3, and showing a manner in which the column of the tool head may be rotatably attached to the cross-carriage of the superstructure.

Fig. 5 is an enlarged vertical cross section through the angle tool head of the machine and that portion of the tool head to which the angle head is attached when in use, on the plane indicated by the line 5—5 of Fig. 4.

Fig. 6 is an enlarged cross-section on a plane represented by the line 6—6 of Fig. 5.

Fig. 7 is a cross-section through the frame or stationary supporting structure, taken on a plane represented by the line 7—7 of Fig. 2, this view showing in elevation the tool head turned at an angle of ninety degrees from the position in which it is shown in Fig. 2.

Fig. 8 is a plan view to reduced scale showing the table of the woodworking machine and the tool head set for cross-sawing. In this view my protractor gauge or stop is shown in place on the table and set to hold a piece of material at an angle to the direction of travel of the tool head and saw.

Fig. 9 is a fragmentary perspective view showing a form of split mechanism which may be used in the practise of the invention.

Fig. 10 is a diagrammatic elevational view, showing the angle head secured to the tool head with the spindle thereof in angled position, and illustrating a manner of sawing a bevel on the end or side of a piece of material secured to the table.

Fig. 11 is an enlarged elevation showing rollers for holding the longitudinal feed chain and sprocket in operative engagement.

Fig. 12 is an enlarged section on the plane represented by the line 12—12 of Fig. 2, showing a simple form of clamping mechanism which may be used in the practise of the invention for locking the longitudinal or cross carriages in any selected position relative to the table.

Referring first to Figs. 1, 2, 4 and 7, the herein described simple embodiment of my invention includes a table 15 which is suitably supported on legs 16, these legs being of such length that the table will be positioned at approximately the height of an ordinary woodworking bench. Upwardly extending at the ends of the table 15 are posts 18 supporting longitudinal track members 19 which in simple form may consists of structural angles having legs 20 horizontally and outwardly projected, as shown in Fig. 7, so that the wheels 21 of the traveller 22 may roll upon the longitudinal track portions thus provided by the horizontally outstanding legs 20. This traveller 22 is in the form of a rectangular frame, including side bars 23 made from structural channels as best shown in the cross section Fig. 4, and end plates 24. The traveller 22 has its length disposed cross-wire, or at 90 degrees to the length of the table 15 and the longitudinal track members 19, and is of such length as to project beyond the sides of the table 15 to a desired extent.

Cross tracks 25 are provided in the traveller 22, such tracks 25 being extended horizontally at an angle of 90 degrees relative to the direction of extension of the track members 19 on which the traveller 22 is movable. The tracks 25 may be conveniently formed by securing plates 27 to the bottom legs 28 of the side channels 23 forming the side members of the traveller 22, these plates being of such width as to extend inwardly beyond the inner faces of the members 23 in the manner shown in Fig. 4, thereby forming inwardly projecting parallel ledges or tracks 25 on which the wheels or rollers 30 of the cross-carriage 31 may run, this cross-carriage being so termed for the reason of its cross movement relative to the longitudinal axis of the woodworking machine. The cross-carriage 31 may be conveniently made from a rectangular plate 32 having the rollers 30, which are four in number, secured thereto on shaft bolts 33.

As shown best in Figs. 1, 2, and 7, structural angles 35 may be secured across the tops of the channel members 23 of the traveller 22, near the ends thereof, and with legs 36 upwardly projecting parallel to the outer edges of the track members 19 as shown in Fig. 7, so as to provide means whereby the shafts 37 on which the rollers or wheels 21 operate, may be secured to the traveller 22.

From the foregoing it will be seen that the elements of my structure include a horizontal table 15 having a length possibly three times the width thereof, a horizontal track member supported above the table in position parallel to the top of said table, a longitudinally movable traveller which may travel on the longitudinal track members from one end of the table to the other in a plane parallel to the top of the table. The traveller 22 which is longitudinally movable, carries in it a cross-carriage which is adapted to move in the cross-tracks of the traveller, across the top of the table, in a line at right angles to the length of the table. It will be seen that by moving the traveller 22 and the cross-carriage 31 simultaneously, any direction or angle of movement of the cross-carriage may be obtained, and it may be stopped and clamped in position above any part of the table 15.

In Figs. 2 and 4 I show a vertical column 40 projecting down from the cross-carriage 31, this column 40 having the purpose of supporting in operative position a working head or tool head 41, there being a cylindrical wall 42 in substantially the center of the tool head 41 having a bore 43 of a size to receive the lower end portion of the column 40. The bottom web 44 of the tool head 41 is preferably flat and horizontal, and supports at its outer edges a front wall 45, rear wall 46, and left and right side walls 47 and 48. On the lower rear portion of the column 40 a rack 49 is secured, which is vertically aligned and projects into a vertical channel 50 in the cylindrical wall 42 so as to be engaged by a pinion 52 mounted on a shaft 53 secured in the tool head 41 in position parallel to the rear wall 46, in the manner shown in Figs. 3 and 4. Extending through the tool head 41 in position parallel to and near the rightward side wall 48, is a shaft 54 having a handle 55 on the outer end thereof and a worm 56 on an inner portion and in position to engage a worm wheel 57, secured to the shaft 53. By turning the elevator handle 55 which projects from the front 45 of the tool head 41, the engagement of the worm 56 with the worm wheel 57 will cause rotation of the shaft 53 and the pinion 52, thereby causing the pinion to roll along the vertically directed track 49, raising or lowering the head 41 on the column 40. The upper end of the column 40 has a flange 56' screwed onto threads 57' and locked in place by a lock screw 58 as shown in Fig. 4, this flange 56' resting on the upper surface of the cross-carriage 31 and providing a suspension engagement for the column 40, which column, as shown, projects through a central opening 60 in the carriage 31. The column 40 may be rotated on its vertical axis through an angle of 360 degrees, thereby making it possible to swing the tool head 41 on a vertical axis and relative to the table 15 above which the tool head is held in suspension.

From the preceding paragraph it will be seen that it is possible to set the front wall of the tool head 41, which front wall 45 is equipped with a handle 61, parallel to the front edge of the table 15 as shown in Figs. 1 and 2, or to place the front wall 45 at an angle of 90 degrees, or other angle, relative to the front edge of the table 15. A ring nut 62 threaded on the upper portion of the column 40 in a position just below the lower face of the cross-carriage 31, may be engaged by a suitable lever 63 and rotated tightly into position against the under-surface of the cross-carriage 31 so as to clamp the column 40 tightly in any position to which it may be rotated for the purpose of positioning the tool head 41 relative to the table 15 of the woodworking machine.

A motor support 65, hinged at 66 to the rear wall 46 of the tool head 41, supports a motor 67 having a step-cone pulley 68 mounted on the rightwardly projecting end of its shaft, so that such step-cone pulley will be in alignment with a co-operating pulley 69 mounted on the rightwardly projecting end 70 of a tool head spindle 71, which spindle 71 is mounted at the front end of the tool head 41 in position parallel to the front wall 45 and in a plane below the vertical center of the tool head, thus bringing the spindle into a position in the lower right hand corner of the leftward wall 47 of the tool head 41, as shown in Fig. 4.

Fig. 5 shows the spindle 71 and that portion of the tool head 41 in which the spindle 71 is supported, these parts being in section on the plane indicated by the line 5—5 of Fig. 4. As shown in Fig. 5, the spindle 71 has an axial bore 72, the leftward or forward end of which is outwardly tapered or expanded to form a standard taper tool socket 73 into which the tapered shanks 74 of the various arbors employed in the operation of the machine may be inserted and securely held. The leftward or forward end of the spindle 71 projects through the leftward wall 47 to what we shall hereinafter term the working face 75 of the tool head 41, which working face 75 is the outer vertical face of the leftward wall 47 of the tool head 41.

In this disclosure of the invention, we are not particularly concerned with the minute illustration of well known mechanical expedients, therefore the mechanisms employed in the practise of my invention are shown in their simplest form, it being understood that the most suitable mechanical equivalents may be substituted therefor, such as the substitution of roller or ball bearings in the place of sleeve or friction bearings where I have shown such sleeve bearings throughout the drawings of this application. In keeping with this simplified form of illustration, I show the leftward or forward end of the spindle 71 supported in a sleeve bearing installed in a hub or boss 77 cast integrally with the wall 47, and I show the rightward end of the spindle 71 supported in a sleeve bearing 78 and having a thrust bearing flange 79 formed thereon adapted to operate between a thrust ring 80 and a thrust adjustment nut 81, in this manner providing both radial and thrust bearings for the spindle 71.

As shown in Figs. 3, 4, and 5, an annular rib 83 projects outwardly from the working face 75, around and concentric with the forward end of the spindle 71, this concentric rib 83 having the purpose of centralizing on the working face 75 a swivel or angle head 84, which is shown in vertical position in Figs. 2 and 5. As shown in Figs. 5 and 6, the angle head 84 has an inwardly disposed machined face 85 which engages the working face 75 of the tool head 41. On the longitudinal axis of this angle head 84 a spindle 86 is supported in bearings 87 and 88, the bore 89 of said spindle being enlarged at its lower end to provide a taper socket 90, preferably of size identical to the taper socket 73 of the spindle 71, so that the shanks of tool arbors and attachments may be interchangeably employed between the sockets of the spindle 71 and the spindle 86.

A cavity 92 is formed in the center of the angle head 84, this cavity being in open communication with the inner machined face 85, being substantially concentric with the groove 93 formed in the machined face 85 and being of a size to fit over the gear 106. The groove 93 in the face 85 of the angle head 84 fits closely over the rib 83 and by this co-engagement serving to establish the position of the angle head 84 on the working face 75, but permitting rotation thereof. For the purpose of securing the angle head 84 in place I provide a stud 94 which projects outwardly through a curved slot 95, which slot is formed concentric with the axis of the spindle 71 and the annular rib 83, as plainly illustrated in Fig. 4. The outer end 96 of the stud 94 extends into a hole 97 provided therefor in the body of the angle head 84 and is equipped with a lateral circular hole 98 near its projecting end adapted to be engaged by an eccentric cylindrical portion, or cam, 99 provided on the inner end of a locking pin 100 which enters the body of the angle head 84 from the side, as shown in Fig. 6, there being a head 101 or other suitable engagement means on the outer end of the locking pin 100 for engagement of a wrench. By the simple manipulation of the locking pin 100, the angle head may be quickly clamped in any position on the working face 75 between vertical and horizontal, the setting of the angle head being accomplished by rotating the angle head on its center which is defined by the co-engagement of the annular rib 83 with the groove 93, and then rotating the cam 99 into clamping position. On the central portion of the spindle 86 a miter gear 105 is secured, this gear being in proper position to be driven by a driving gear 106 secured on the arbor 74 which is held in the socket 73 of the spindle 71, there being provided means for locking the taper shank or arbor firmly in the taper socket 73, having the form of a long machine screw or threaded rod 107 with a head 108 on its outer end by means of which it may be turned to be screwed tightly into a co-operating threaded portion 109 in the inner end of the shank 74.

In a like manner, an arbor 110 having its shank 111 inserted in the taper socket 90 of the angle head spindle 86, may be secured against removal by a locking screw 112 having an externally projecting nut portion 113. In Fig. 5 I show the arbor 110 fitted with a routing tool 114 and illustrate this routing tool in operation on the upper face of a board or article of work 115 which is being formed in the woodworking machine. The motor 67 shown in Fig. 3, is adapted to drive the tool head spindle 71 of the tool head 41 by means of a belt which runs over the step-cone pulleys 68 and 69. The rotation of the spindle 71 is transmitted through the miter gears 106 and 105 to the vertical spindle of the angle head 84, thereby imparting rotation to whatever tool, such as the router 114, may be secured in the taper socket 90 of the angle head 84.

In Fig. 2 of the drawings, I show the spindle of the angle head 84 equipped with an arbor 120 having a dado cutter 121 mounted thereon, the cutting edge of this dado cutter 121 being shown in engagement with the edge of the work 115 held by means of clamps 122 and wood blocks or parallel spacing strips 123 in position parallel to the top of the table 15. To adjust the vertical position or height of the cutter 121 relative to the edge of the work 115, the elevator handle 55 is rotated and the pinion 52 of Figs. 3 and 4 is caused to roll vertically on the rack 49, thereby setting the tool head 41 to the desired proper working height with respect to the edge of the work 115. On a shaft 125, Fig. 1, extending through the structure of the traveller 22, a sprocket 126 is mounted in proper position to engage a rack or chain 127 extending longitudinally through the length of the superstructure of the woodworking machine and between the end plates 128 and 129 which tie across the ends of the longitudinal track members 19.

By use of a handle 130 on the outward end of the shaft 125, the sprocket 126 may be rotated, and through engagement with the chain 127 it will cause the traveller 22 to move in longitudinal direction depending on the direction in which the handle is rotated; therefore, by manipulation of the handle 130 it is possible to move the traveller 22, the tool head 41, and the tool 121 into cutting engagement with the work. When the proper depth of cut is thus established, the handle 132 may be employed to rotate a screw 133 extending through the structure of the traveller 22 and by engagement of the screw 133 with a nut 134 attached to the cross-carriage 31, to feed the cross-carriage across the table 15 and along the edge of the work which extends transverse relative to the length of the table 15, cutting in the edge of the work 115 a dado groove or slot 136 such as shown in Fig. 5, or a groove of any other form by the use of a properly shaped tool.

As shown in Fig. 11, the sprocket 126 may have rollers 137 co-operative therewith for the purpose of holding the chain 127 in proper engagement with the teeth of the sprocket. These rollers 137 may be conveniently held on a plate 138 secured at 139 to the side channel 23 of the traveller 22. The engagement of the sprocket 126 with the chain 127 provides no resistance to movement of the traveller 22 along the longitudinal track members 19, therefore it is possible to push the traveller 22 from one end of the table to the other, which would be the operation followed in ripping lumber by use of a saw 140 mounted in the horizontal spindle 71 of the tool head 41 in the manner shown in Fig. 7, this saw 140 being mounted on an arbor 142 and such arbor being equipped with the proper taper shank to fit into the taper socket 73 of the spindle 71. For longitudinal or rip sawing the column 40 is rotated to bring the working face 75 of the tool head 41 into longitudinal position, or in other words, into position parallel to the length of the table 15.

In setting up for this operation, the column 40 is first rotated to proper position so as to correspondingly set the tool head 41 and the saw 140. The saw 140 is then brought into position above the line on which the cut is to be made by moving the cross-carriage 31 along the tracks 25 provided by the traveller 22, this being done by rotation of the feed screw 133 and the co-operative engagement therewith of the nut 134 which is attached to the cross-carriage 31. When the saw 140 is set in proper alignment, the motor 67 may be started by proper manipulation of a motor control switch 145 conveniently mounted at the front of the tool head 41 and while the saw 140 is in rotation the tool head may then be lowered, or may have been previously lowered, by use of the elevator handle 55, after which the traveller may be caused to advance longitudinally by hand pressure through engagement of the handle 61, or by means of the longitudinal feed which is operated through manipulation of the handle 130. The engagement of the screw 133, Fig. 1, with the nut 134 provides a lock for preventing movement of the cross-carriage 31, except by operation of the cross feed handle 132.

In Fig. 8 I show a plan view of the table 15 on which a blade 148 of a protractor gauge 149 is secured by means of bolts 150, or otherwise as may be desired. The protractor gauge 149 has a swinging blade 151 hinged thereto at 152, and a curved arm 153 extends rearwardly from the blade 151 across the stationary blade 148, there being a clamping means provided at 154 for the purpose of locking the blades 148 and 151 in any desired relative position. It may be advisable to mark the curved member 153 in degrees so that the angle of the gauge member 149 may be quickly set. In Fig. 8 I show the tool head 41 rotated into position with its working face 75 at right angles to the length of the table, so that the saw 140, held in the spindle 71 thereof will be in proper position for cross-cutting or mitering. A board 154 placed against the gauge member 151 in the manner shown will be cut off by the saw 140 at any desired angle to which the gauge is set.

In Fig. 10 I show the angle head 84 turned diagonally to the work 155, thereby placing the saw 140 in an inclined position so that a bevel edge 156 will be cut on the work when the tool head is moved to advance the saw in proper direction. Attention is called to the simplicity and ease with which the woodworking machine is set up to perform the many operations required in fine cabinet making, door fitting, etc. The cumulative effect of an entire woodworking shop of the present type is attained in the use of a single machine embodying the invention, and the operations may be performed consecutively on the work which is mounted horizontally on the table 15, by setting up the tool head or angle head with proper tools, and in nearly every instance without the necessity of repeatedly moving the work from position to position for the reason that the important feature of the woodworking machine is to move the tool in any direction relative to the work, instead of moving the work relative to the tool as is necessary in a greater portion of the woodworking equipment now in use.

For cross-cut work such as illustrated in Fig. 8, or for any other operation in which the cross-carriage is employed, it may be desired to manually move the tool head 41, therefore, for the purpose of releasing the lead screw 133 so that the cross-carriage 31 may move freely in its guide or tracks, I desire to employ a split nut which may be as shown in Fig. 9 in which upper and lower half nuts 170 and 171 are shown vertically slidable upon a vertical plate 172, there being a member 173 extending upwardly from the lower half 171, this member 173 having a pivot 174 supporting a cam 175 which may be rotated by a pull rod 176 which engages the extending lever 177, the cam 175 thereon forcing down on the half-nut 170 and drawing up on the half-nut 171, with the result of closing the nut on the screw 133. It is desirable to clamp one or the other or both of the carriages 22 and 31, as occasion may require, and for this purpose any of the various known locking or clamping devices may be used, a simple form thereof being shown at 180 in Figs. 1 and 2, applied as a lock for the traveller 22, it being understood that a similar lock may be employed for the cross-carriage.

In the enlarged cross-section, Fig. 12, I show the casing 180 with a vertical slide-bar 181 supporting clamp blocks 182 and 183 which are forced together by a screw 184 so as to clamp the outstanding portions 20 of the track members 19. A suitable lock for the tool head 41 has the form of a block 185 adapted to be clamped against the rack 49 by a screw 186 having its head exposed for engagement of a wrench.

Although I have illustrated and described my invention in operation with a limited number of the different types of tools, the expert will readily understand and appreciate that nearly every type of tool may be employed in either of the spindles of the machine, so as to perform a practically unlimited variety of operations. By the use of a milling cutter on an arbor placed in the spindle a more accurate job of jointing may be done than possible in the present type of equipment where the work or lumber is moved by hand across the cutter, for the reason that the jointing tool is moved through a definite true plane when the selected carriage is moved along its tracks, thereupon trimming the edge of the material to a true plane. Sanding, either by drum or disc, is done with greater facility than now obtained in present sanding equipment, and the machine may be quickly set to cut complex combination skew or bevel miters such as employed in rafter work.

From the foregoing the great variety of uses of the equipment may be readily perceived and for the purpose of simplicity in exposition I have shown my invention in its most simple form. It is advisable to here point out that I intend to employ all equivalents known to the mechanical arts and that the invention is not limited by the simplicity of the foregoing disclosure, but is to be limited solely by the hereafter stated claims.

I claim as my invention:

1. In a device of the character described: a work support; a horizontally movable carriage member spaced above said work support; a superstructure above said work support having parts supporting said carriage member so that said carriage member will have movement in all directions through a horizontal plane above said work support; a vertical column extending down from said carriage; a tool head on the lower portion of said column; a spindle mounted in said tool head adapted to hold a tool for operation on work held on said work support; a motor mounted on said tool head; a driving connection between said motor and said spindle; and means for moving said tool head on said column.

2. In a device of the character described: a work support; a horizontally movable carriage member spaced above said work support; a superstructure above said work support having parts supporting said carriage member so that said carriage member will have movement in all directions through a horizontal plane above said work support; a vertical column extending down from said carriage, said column being rotatable on a vertical axis; a tool head on the lower portion of said column; means for moving said tool head vertically on said column; a spindle mounted in said tool head adapted to hold a tool for operation on work held on said work support; a motor mounted on said tool head; and a driving connection between said motor and said spindle.

3. In a device of the character described: a work support; a horizontally movable carriage member spaced above said work support; a superstructure above said work support having parts supporting said carriage member so that said carriage member will move in all directions through a horizontal plane above said work support; a vertical column extending down from said carriage, said column being rotatable on a vertical axis; means for clamping said column against rotation; a tool head on the lower portion of said column; means for moving said tool head vertically on said column; a spindle mounted in said tool head adapted to hold a tool for operation on work held on said work support; and means for driving said spindle.

4. In a device of the character described: a work support; a tool head adapted for horizontal movement above said work support; a superstructure above said work support for supporting said tool head in a manner that it may be moved through a horizontal plane; a horizontal spindle in said tool head; means for driving said horizontal spindle; and a detachable swivel head having means for securing it to swing in a vertical plane at the end of said horizontal spindle; and a secondary spindle in said swivel head adapted to be driven from said horizontal spindle.

5. In a device of the character described: a work support consisting of a substantially horizontal table; a superstructure above said table providing longitudinal guide means parallel to the working plane of said work support; a traveller having movement in said longitudinal guide means; cross guide means forming part of said traveller, said cross guide means extending in opposite directions beyond the confines of said work support; a cross-carriage moveable in said cross guide means of said traveller; a column extending downwardly from said cross-carriage; and a tool head carried on the lower portion of said column, there being means for adjusting said tool head vertically and so that said tool head may be faced in a number of directions in a horizontal plane.

6. In a device of the character described: a work support consisting of a substantially horizontal table; a superstructure above said table providing longitudinal guide means parallel to the working plane of said table; a traveller having movement in said longitudinal guide means; cross guide means forming part of said traveller; a cross carriage movable in said cross guide means; a vertical column extending down from said cross-carriage; a tool head on the lower portion of said column; means enabling vertical movement of said tool head; a primary spindle in said tool head; means for driving said primary spindle; a detachable swivel head having means for securing it to swing in a plane perpendicular to said primary spindle; and a secondary spindle carried by said swivel head adapted to be driven from said primary spindle.

7. In a device of the character described: a work support consisting of a substantially horizontal table; posts extending upwardly at the ends of said table; a superstructure supported by said posts in position above said table providing relatively longitudinal guide means parallel to the working plane of said table; a traveller having movement in said relatively longitudinal guide means; cross guide means forming part of said traveller; a cross-carriage moveable in said cross guide means; a vertical column extending downwardly from said cross-carriage; a tool head on the lower portion of said column; means for moving said tool head vertically on said column; a horizontal spindle mounted in said tool head, having the end thereof adapted to hold a tool for operation on work held on said table; a motor mounted on said tool head; and a driving connection between said motor and said spindle.

8. A device as defined in claim 7, including: a swivel body secured at the end of said spindle of said tool head in a manner to swing in a vertical plane, there being a spindle in said swivel body for holding a tool in operative position relative to the work held on said table.

9. A device as defined in claim 7, including: means for locking each said traveller and said cross-carriage in its respective guide means, thereby limiting the movement of the tool head in a horizontal plane to the movement of such traveller or cross-carriage which may be left free to move in its guide means.

10. A device as defined in claim 7, including means for moving said traveller and means for moving said cross-carriage, together with locks for either said traveller or said cross-carriage, having the function of selectively preventing movement of these members.

11. A device of the character described, including: a work supporting table longitudinal track means supported above the plane of said table; a traveller moving along said track means, having horizontal cross-track means extending under said longitudinal track means; a carriage movable in said cross-track means under said longitudinal track means; tool operating mechanism suspended from said carriage for operation on work held by said work supporting table; means for moving said traveller along said track means; means for locking said traveller immovably; means for moving said carriage in said cross-track means; and means for locking said carriage immovably in said cross-track means.

12. A device as defined in claim 11, including in said tool operating mechanism: a tool head supporting member projecting down from said carriage but being spaced away from said table; a tool head on said tool head supporting member; means for moving said tool head on said tool head supporting member; a motor on said tool head; and holders for tools carried in said tool head, adapted to be driven from said motor.

13. A device as defined in claim 11, including in said tool operating mechanism: a tool head supporting member projecting down from said carriage, said supporting member being rotatable on a vertical axis; means for locking said supporting member against rotation; a tool head at the lower end of said tool head supporting member; a tool receiving spindle carried by said tool head; and power means for driving said spindle.

14. In a device of the character described: a work support; a horizontally movable carriage member spaced above said work support; a superstructure above said work support having parts supporting said carriage member so that said carriage member will have movement in all directions through a horizontal plane above said work support; a vertical column extending down from said carriage, said column being rotatable on a vertical axis; a tool head on the lower portion of said column; means for moving said tool head vertically on said column; a spindle mounted in said tool head adapted to hold a tool for operation on work held on said work support; and power means for driving said spindle.

15. A woodworking device of the character described, including: a horizontal work support; a horizontally movable carriage member spaced above said work support; a superstructure above said work support having parts supporting said carriage member so that said carriage member will have movement in a plurality of directions in a horizontal plane; and tool holding and operating means suspended from said carriage, said means being adjustable to face in a plurality of directions in a horizontal plane.

16. A woodworking device as defined in claim 15, in which said tool holding and operating means is also adjustable vertically relative to said work support.

Signed at Los Angeles, in the county of Los Angeles and State of California, this 11th day of April, 1928.

CLAUDE R. CRUMP.